Jan. 3, 1967    JAMES E. WEBB    3,295,798
ADMINISTRATOR OF THE NATIONAL AERONAUTICS
AND SPACE ADMINISTRATION
LANDING GEAR
Filed Nov. 10, 1964    3 Sheets-Sheet 1
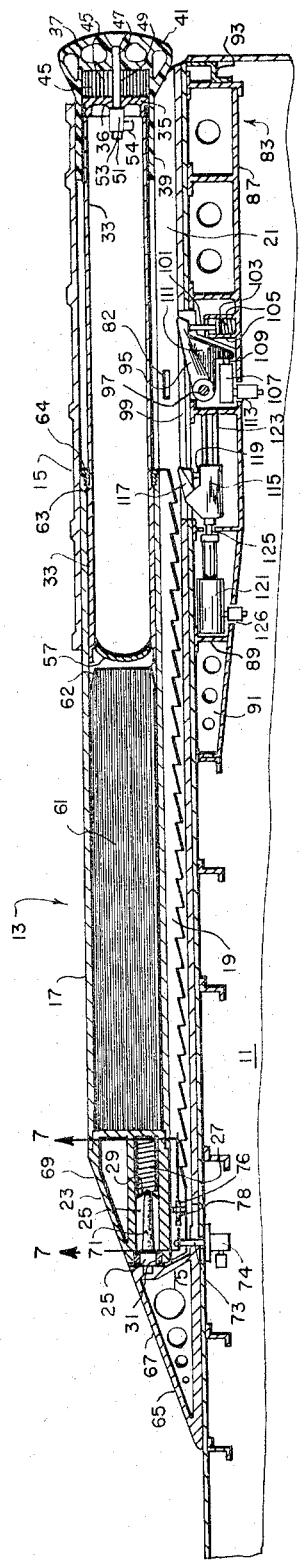
RUSSELL L. HOPPING
WILLIAM R. FORLIFER
ROBERT P. GASTON, JR.
INVENTORS
BY
ATTORNEYS

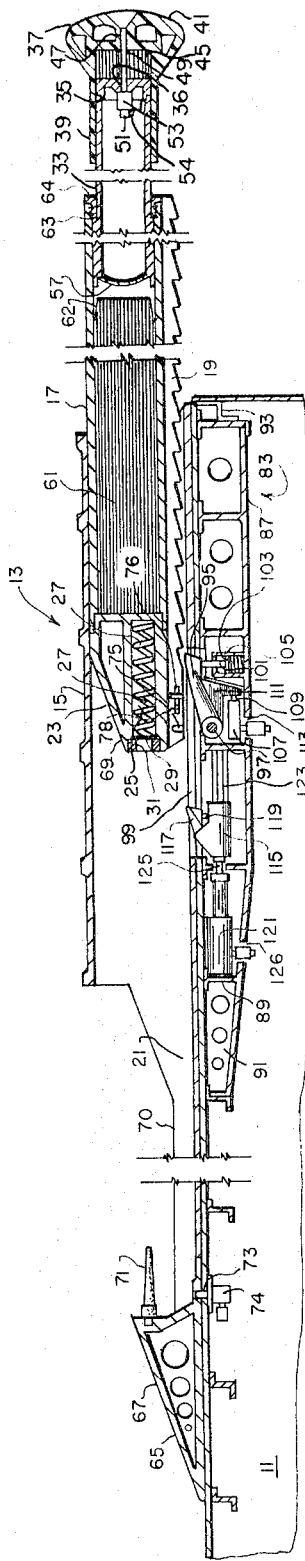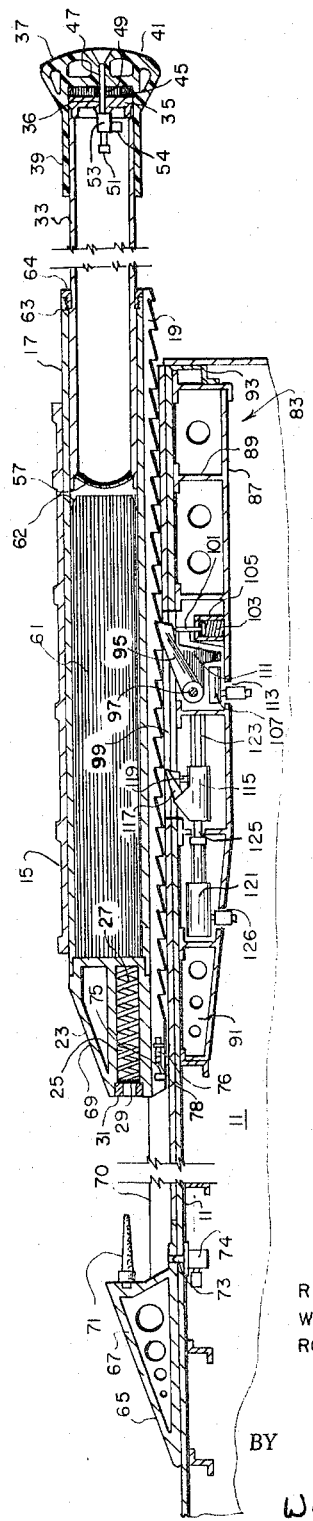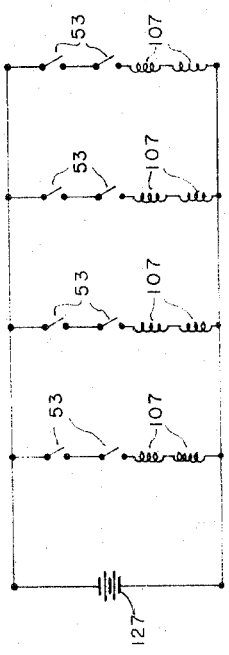

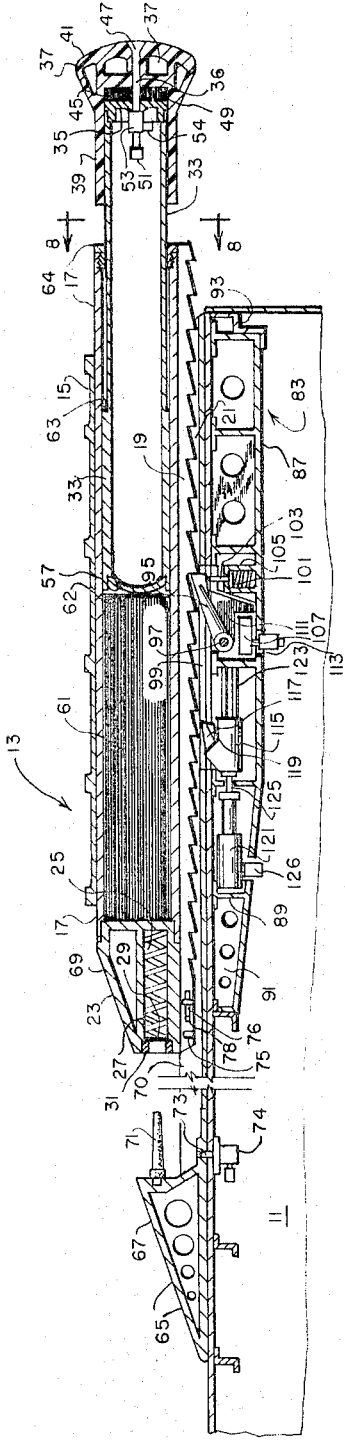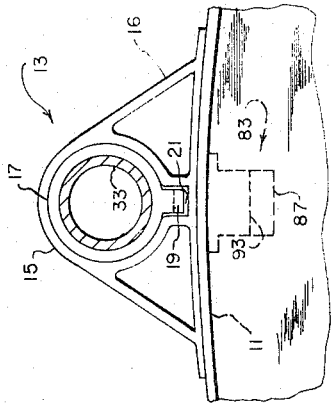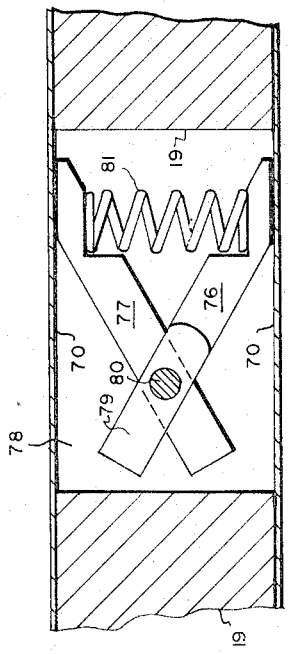
RUSSELL L. HOPPING
WILLIAM R. FORLIFER
ROBERT P. GASTON, JR.
INVENTORS United States Patent Office 3,295,798
Patented Jan. 3, 1967

1

3,295,798
LANDING GEAR
James E. Webb, Administrator of the National Aeronautics and Space Administration with respect to an invention of Russell L. Hopping, William R. Forlifer, and Robert P. Gaston, Jr.
Filed Nov. 10, 1964, Ser. No. 410,331
5 Claims. (Cl. 244—100)

This invention relates generally to landing gear and more particularly to landing gear for bringing a flight vehicle to a satisfactory landing on rough terrain.

Current and future space and aeronautical projects involve the landing of flight vehicles on unprepared terrain. When such landings are made, runways will not be available to permit a flight vehicle to roll to a gradual, safe stop on conventional wheeled landing gears. Nor can it be taken for granted that level surfaces will be available on which to land vertically descending flight vehicles. Manned space flights to the moon may require the landing of vertically descending flight vehicles on irregular surfaces. The same applies for landings which may be made on other stations in space as well as landings which may occur at unprepared earth locations.

It is essential, therefore, that manned vehicles landing on surfaces of unknown and unprepared character be equipped with a landing gear system which is capable of effecting a proper landing on a variety of surfaces ranging from smooth to rough. Not only must the landing be entirely safe for the vehicle occupants, but the vehicle must not be damaged or its take-off ability impaired. Futhermore, it is highly desirable that the vehicle maintain a virtually level or vertical attitude during and after completion of the landing.

Prior landing gear systems provide means for absorbing energy and easing shock during the process of landing a vertically descending flight vehicle. These prior systems, however, begin to absorb the main landing thrust immediately upon making contact with the landing surface, and, unless contact by all landing points is approximately simultaneous, an overturning force is transferred to the flight vehicle. Naturally, such overturning forces are undesirable since they will produce at minimum a rough and jarring landing and at maximum a disastrous capsizing of the flight vehicle.

Thus it is seen that if the landing surface is not level, simultaneous contact by all contact points of a multipoint landing gear system cannot be relied on to avoid overturning forces. If the landing surface is sloping, for example, and the flight vehicle descends vertically the first point or points of contact the surface will transfer the impact force to the flight vehicle, urging it to roll over in a downhill direction. Even if the impact force were absorbed sufficiently to avoid overturning, the flight vehicle would not come to rest in a level posture, as desired.

Accordingly, it is a general object of this invention to provide a landing gear for a flight vehicle which will permit the vehicle to make a satisfactory landing on either a smooth or rough surface.

More specifically, it is an object of the invention to provide a landing gear system for vertically descending flight vehicles which will bring a vehicle to a gradual stop while avoiding the transfer of overturning forces to the vehicle even though the landing occurs on a sloping surface.

A further object is to provide a landing gear system for a vertically descending flight vehicle which maintains the vehicle in a level attitude during and after a landing made on either a smooth or rough surface.

2

Other objects, uses and advantages of the present invention will become apparent as the description proceeds.

The invention comprises a plurality of energy-absorbing landing struts carried by a flight vehicle which are adapted to extend from the vehicle during a vertically descending landing thereof to make initial contact with the landing surface. Preferably, the struts are arranged in diametrically opposed pairs with all struts being spaced an equal distance from the vertical axis of the vehicle. Each strut when extended for a landing is free to slidably retract upon contacting the landing surface.

An electrical switch associated with each strut is immediately closed when the strut contacts the landing surface. This switch, when closed under a certain condition explained below, actuates a locking means for the strut which will lock the strut either in its extended position or at any instant during retracting movement. The switches for each pair of opposed struts are series connected in an electrical circuit so that the locking means for any given strut will not be actuated until its diametrically opposed strut has contacted the landing surface thus creating a condition wherein both series connected switches are closed thereby permitting current to flow in the circuit and simultaneously actuate the locking means for both struts.

This system assures that the landing forces transferred from the landing struts to the flight vehicle are always balanced symmetrically with respect to the vertical axis of the vehicle. Therefore, the vehicle is not subjected to overturning moments even though the landing surface is unlevel. Leveling devices are incorporated in each strut for correcting any minor deviation from a level vehicle attitude after the vehicle has come to rest.

FIGURE 1 is an elevational view of a vertically descending flight vehicle landing on a sloping surface, initial contact having been made by a landing gear strut.

FIGURE 2 is a plan view of FIGURE 1.

FIGURE 3 is a fragmentary cross-sectional view showing a landing strut in its initial retracted position secured to the exterior surface of the flight vehicle.

FIGURE 4 is a broken cross-sectional view showing the landing strut extended before contacting the landing surface.

FIGURE 5 is a broken cross-sectional view showing the landing strut in a locked and partially retracted position after contacting the landing surface.

FIGURE 6 is a broken cross-sectional view showing the landing strut in its final retracted position after the flight vehicle has come to a controlled stop after touchdown.

FIGURE 7 is an enlarged cross-sectional view taken along line 7—7 of FIGURE 3.

FIGURE 8 is a cross-sectional view taken along line 8—8 of FIGURE 6.

FIGURE 9 is an electrical circuit diagram illustrating an electrical arrangement of switches and solenoids which control the locking of the landing struts.

Referring now to FIGURES 1 and 2, a flight vehicle 11 is provided with a landing gear system comprising a plurality of landing struts 13. These landing struts are secured in equally spaced relationship around the flight vehicle 11 near the lower end thereof.

When landing, the flight vehicle 11 descends principally in a vertical direction. Before contact is made with the landing surface all of the landing struts 13 are extended for making initial contact with the landing surface and bringing the vehicle to a controlled stop in a nearly level attitude.

Referring to FIGURES 3 through 6 and 8, each of the landing struts 13 comprises a support housing 15 having a diverging, substantially hollow base 16 (FIGURE 8) which is mounted on the exterior surface of the flight vehicle 11. A cylinder 17 is slidably disposed within the housing 15 and carries a toothed rack 19 which slides within a groove 21 formed in the housing. The trailing end of the cylinder 17 is closed by a plug 23 which has a socket 25 therein for receiving a spring 27. A cap 29 fits over the end of the spring 27 and compresses against a retaining ring 31. Within the cylinder 17 a piston 33 is telescopically arranged and, normally, the greater portion of its length extends beyond the leading end of the cylinder 17. The distal or free end of the piston 33 is provided with a plug 35 having an aperture 36 through the center thereof. A foot 37 comprises a tubular extension 39 which slips over the end of the piston 33 and the plug 35. The foot 37 has an enlarged flaring portion 41 which provides a convex surface for making initial contact with the landing surface.

A crushable energy-absorbing material 45, such as metallic honeycomb, is provided within the foot 37 and bears on the plug 35. Apertures 47 and 49 formed in the center of the foot 37 and crushable material 45, respectively, are in alignment with each other and with the aperture 36 in the plug 35. A plunger 51 extends through each of these apertures. The plunger 51 also extends through and actuates a pressure switch 53 which is mounted on the inside of the plug 35 in alignment with the aperture 36. The switches 53 in the several struts are electrically interconnected through wires 54 in a circuit described hereinafter.

The end of the piston 33 within the cylinder 17 is provided with an end cap 57. Between this end of the piston 33 and the plug 23, the cylinder 17 contains an energy absorber which may be in the form of a crushable material 61 such as metallic honeycomb. A pneumatic, hydraulic or combination energy absorber also may be used, particularly where a reusable strut is required. The end of the crushable material 61 adjacent the end cap 57 is tapered inwardly at 62 so as to provide a proper onset rate of development of the crushing load (decelerating force) when the piston 33 slides within the cylinder 17, as explained, hereinafter. To prevent the piston 33 from sliding out of the cylinder 17 the portion of the piston within the cylinder has an enlarged diameter forming a shoulder 63 which bears on a retainer ring 64 screwed into the end of the cylinder.

A hollow support fairing 65 is mounted on the flight vehicle 11 in the sliding path of the cylinder 17. When the strut 13 is fully retracted, as in FIGURE 3, the plug 23 at the trailing end of the cylinder 17 abuts fittingly against the support fairing 65. The support fairing 65 has a slanting configuration 67 which coincides with a slanting configuration 69 of the plug 23 to provide a continuous tapered surface from the cylinder 17 to the surface of the flight vehicle 11. Integral with the housing 15 is a channel-shaped element 70 forming an extension of the groove 21 from the housing 15 to the support fairing 65.

Mounted on the support fairing 65 in axial alignment with the spring socket 25 is a tapered stud 71. When the strut 13 is fully retracted, as shown in FIGURE 3, the stud 71 projects into the spring socket 25 resulting in a compression of the spring 27.

The strut 13 is locked in its retracted position by a pin 73 which moves in and out of a socket 75 in the trailing end of the toothed rack 19. The pin 73 may be electrically actuated as by a solenoid 74 mounted inside the flight vehicle. Withdrawal of the pin 73 from the socket 75 releases the strut 13 for extension under force provided by the compressed spring 27 and/or gravity.

Extension of the strut 13 is limited by spring-loaded stop pawls 76 and 77 (see FIGURE 7) which are mounted in a slot 78 extending transversely through the toothed rack 19 near the trailing end of the cylinder 17. The pawl 76 has a bifurcated end 79 which receives the end of the pawl 77 in a pivot connection effected by a pin 80. A compressed spring 81 is secured, as by welding, if desired, between the ends of the pawls opposite the pin 80 thereby urging the ends outwardly against the sides of the groove 21. When the strut extends a proper predetermined distance the spring-loaded pawls 76 and 77 expand into recesses 82 located on opposed sides of the groove 21. This stops extension of the cylinder 17, leaving it free to retract, however, since the pawls 76 and 77 will be cammed out of the recesses 82 upon retracting movement of the cylinder.

An enclosure 83 is provided inside of the flight vehicle 11 in alignment with the cylinder 17. The enclosure comprises a panel 87 having integral ribs 89 which abut the inside of the flight vehicle skin panel. Side walls 91 and an end box rib 93 are arranged around the panel 87.

Within the enclosure 83 is a locking pawl 95 pivotally connected to a pin 97 which extends transversely of the enclosure 83. In its locking position the locking pawl 95 engages the toothed rack 19 through a slot 99 extending through the bottom of the groove 21 and the exterior skin panel of the flight vehicle. The pawl is biased toward its locking position by a plunger 101 which is urged outwardly by a spring 103 contained within a cylinder 105. The locking and unlocking function of the pawl 95 is controlled by an electrically operated device 107 such as a solenoid or an electrical exploding device which when energized releases a connection 109 between the device 107 and an extension 111 of the pawl 95. The connection 109 holds the pawl 95 in its unlocking position and when it is released the pawl is urged into its locking position by the spring-urged plunger 101. Electrical connections to the device 107 are made through an aperture 113 formed in the enclosure panel 87.

It is understood that the locking pawl 95 is used to stop retraction of the cylinder 17 at the desired position within the support housing 15. However, when the retraction of the cylinder 17 is prevented by the locking pawl 95, the cylinder can still be extended without disengaging the pawl from the toothed rack 19 if sufficient extending force is applied to the cylinder to cause the slanting surfaces of the toothed rack to slide over the pawl against the bias of the spring 103. This extending force for postlanding precise leveling of the vehicle may be furnished by a jack 115 mounted within the enclosure 83. The jack 115 may be electrically operated and comprises a pivotally mounted pawl 117 for engaging the toothed rack 19. Engagement of the pawl 117 may be effected by a spring-loaded plunger 119 which is electrically released after the landing operation and energy absorption cycle is complete. Any selected landing strut 13 may be extended for vehicle leveling by an electrical linear motor 121 which drives the engaged jack 115 back and forth on track rods 123 through a rack 125. Electrical connections to the motor 121 are made through an opening 126 in the panel 87. The stroke of jack 115 is sufficient to drive the toothed rack 19 past locking pawl 95 a distance of one tooth length such that pawl 95 locks the rack on a sucessive tooth for each stroke of the jack 115. Thus, the crew members may accomplish precise vehicle leveling by selectively extending any landing strut or struts (13) by a distance of one locking rack tooth length at a time.

The circuit of FIGURE 9 has a power source 127 for a circuit containing four branches connected in parallel. Each branch includes the switch 53 and the solenoid 107 for each of two diametrically opposed struts 13. Since the switches and solenoids from the opposite struts are series connected in one branch of the circuit, both switches 53 must close before current flows in the branch to energize the solenoids 107 and permit the locking pawls to engage the toothed rack 19.

Operation of the inventive landing gear system is as follows:

When the flight vehicle 11 is in flight the struts 13 are stowed in the retracted position shown in FIGURE 3, being held by locking pins 73. Prior to landing, the locking pins 73 are electrically withdrawn from their locking position, releasing the cylinder 17 for extension under force of the springs 27. When the cylinders 17 have extended a proper predetermined distance, extension is stopped by the extension stop pawls 76 and 77. The cylinders are then free to slide back into the housing 15.

The flight vehicle 11 descends substantially vertically and initial contact with the landing surface is made by one or more of the foot members 37, the number depending on how level the landing surface happens to be.

Assuming a landing surface slope of about 15 degrees, such as illustrated in FIGURE 1, only one or two foot members 37 will initially contact the landing surface. The kinetic energy of the particular strut or struts making contact is absorbed by the foot 37 of each strut yieldably sliding up on the piston 33 and crushing the crushable material 45 thereby eliminating rebound of the foot from the contacting surface. The plunger 51 slides upwardly with the foot thereby closing the pressure switch 53. The cylinder 17 of each contacting strut will then slide freely within its housing 15 until its diametrically opposed strut contacts the landing surface similarly closing its switch 53. The electrical devices 107, which release the locking pawls 95 of diametrically opposed struts, and the pressure switches 53 of diametrically opposed struts are series connected (see FIGURE 9) and the circuit closes only when both struts of an opposed pair have contacted the landing surface. Therefore, the sliding upward of any strut making contact will not be stopped by its locking pawl 95 until its diametrically opposed strut has also made contact. Both struts are then locked simultaneously by the pawls 95.

At the time the cylinders 17 of diametrically opposed struts, which have contacted the landing surface, are restrained from sliding up further in their housings 15 the flight vehicle still has some vertical velocity. To bring the flight vehicle to rest in a controlled manner after locking of the pawls 95 the pistons 33 slide upwardly within the cylinders 17 thereby crushing the energy-absorbing material 61. The maximum vertical force imposed on the flight vehicle 11 is predetermined by the selection of the density and cross-sectional area of the crushable material 61. The crushable material preferably has a relatively constant load versus stroke characteristic such as obtained from metallic honeycomb.

Since the crushing of the energy-absorbing material 61 can only occur simultaneously in diametrically opposed struts, the vertical loads applied to the flight vehicle are always balanced and cannot cause any overturning moments. Therefore, the flight vehicle remains in a substantially level or vertical attitude throughout the landing process.

After the landing is completed, minor deviations of the flight vehicle from a level attitude may be corrected by use of the jacks 115 provided for extending any of the struts 13, as desired.

While the simultaneous locking of diametrically opposed struts in the number of two has been described, it is understood that the invention contemplates that the simultaneous locking and crushing of the energy absorber may occur only after a number of struts greater than two have contacted the landing surface. For example, where a tripodal landing gear system involved only three struts, the struts would be locked simultaneously only after all three had contacted the landing surface.

Obviously, many modifications and variations of the present invention are possible in the light of the above teachings. It is, therefore, to be understood that within the scope of the appended claims the invention may be practiced other than as specifically described.

What is claimed is:
1. An energy-absorbing device comprising:
 (a) a support housing adapted for mounting on a vehicle;
 (b) a tubular cylinder slidably disposed in said support housing for extending and retracting motion;
 (c) a piston telescopically received in said cylinder with one end of said piston being within said cylinder and the other end of said piston projecting from one end of said cylinder;
 (d) a yieldable foot portion carried by said other end of said piston;
 (e) a crushable energy-absorbing material disposed within said foot portion and within said cylinder;
 (f) said crushable material within said cylinder being contiguous with said one end of said piston whereby retractive sliding of said piston within said cylinder will result in a crushing of some of said material;
 (g) a switch associated with said foot portion responsive to pressure contact of said foot portion with a surface;
 (h) means responsive to said switch for locking said cylinder against retractive sliding within said support housing.

2. The energy-absorbing device as defined in claim 1 including means for slidably extending said cylinder subsequent to locking thereof against retractive sliding within said support housing.

3. The energy-absorbing device as defined in claim 1 wherein said locking means includes a toothed rack carried by said cylinder and a pawl pivotally mounted adjacent said rack for engagement therewith.

4. A flight vehicle landing gear system comprising:
 (a) a plurality of landing struts carried by the bottom portion of said vehicle;
 (b) said struts being arranged in pairs with the struts of each pair being diametrically opposed;
 (c) each of said struts comprising a support housing having a tubular cylinder slidably disposed therein for extending and retracting motion below said vehicle;
 (d) said cylinder of each of said struts having a piston telescopically received therein with one end of said piston being within said cylinder and the other end of said piston projecting from the lower end of said cylinder;
 (e) said piston projecting from each of said cylinders having a yieldable foot portion carried by said other end thereof adapted for contacting a landing surface;
 (f) a crushable energy-absorbing material disposed within each of said foot portions and within each of said cylinders;
 (g) said crushable material within each of said cylinders being contiguous with said one end of the piston of said cylinder whereby retraction of said piston within the cylinder will result in a crushing of some of said material;
 (h) a switch associated with each of said foot portions responsive to pressure contact of said foot portion with a landing surface;
 (i) said switches associated with each pair of said diametrically opposed struts being electrically connected in series with the series connection for each pair of switches being exclusive of the series connection of other pairs of switches;
 (j) means responsive to said switches for simultaneously locking said cylinders of either of said pairs of struts against retractive sliding within said support housings.

5. An energy-absorbing device comprising:
 (a) a support housing adapted for mounting on a vehicle;

(b) a tubular cylinder slidably disposed in said support housing for extending and retracting motion;
(c) a piston telescopically received in said cylinder with one end of said piston being within said cylinder and the other end of said piston projecting from one end of said cylinder;
(d) a yieldable foot portion carried by said other end of said piston;
(e) a crushable energy-absorbing material disposed within said foot portion and within said cylinder;
(f) means for selectively locking said cylinder against retractive sliding within said support housing;
(g) said crushable material within said cylinder being contiguous with said one end of said piston whereby retraction of said piston within said cylinder after locking of said cylinder against retractive sliding will result in a crushing of some of said material thus providing a post-locking energy absorption.

References Cited by the Examiner
UNITED STATES PATENTS

| | | | |
|---|---|---|---|
| 2,846,164 | 8/1958 | Haberkorn | 244—100 |
| 3,032,302 | 5/1962 | Clark | 244—138 |
| 3,038,685 | 6/1962 | Hofmann | 244—103 |
| 3,175,789 | 3/1965 | Blumrich | 244—100 |

MILTON BUCHLER, *Primary Examiner.*

L. C. HALL, P. E. SAUBERER, *Assistant Examiners.*